United States Patent
Tavares Miranda (10) Patent No.: US 12,187,378 B2
(45) Date of Patent: Jan. 7, 2025

(54) PEDAL CRANK DRIVE COMPRISING A PEDAL CRANK AND A CHAIN RING, AND PRODUCTION METHOD

(71) Applicant: MIRANDA & IRMAO, LDA., Agueda (PT)

(72) Inventor: Joao Filipe Tavares Miranda, Agueda (PT)

(73) Assignee: MIRANDA & IRMAO, LDA., Agueda (PT)

( * ) Notice: Subject to any disclaimer, the term of this patent is extended or adjusted under 35 U.S.C. 154(b) by 90 days.

(21) Appl. No.: 17/759,759

(22) PCT Filed: Jan. 29, 2021

(86) PCT No.: PCT/EP2021/052219
§ 371 (c)(1),
(2) Date: Jul. 29, 2022

(87) PCT Pub. No.: WO2021/152155
PCT Pub. Date: Aug. 5, 2021

(65) Prior Publication Data
US 2023/0127274 A1    Apr. 27, 2023

(30) Foreign Application Priority Data
Jan. 31, 2020 (DE) .......................... 102020102460.6

(51) Int. Cl.
*B62M 1/36* (2013.01)
*B62M 9/00* (2006.01)

(52) U.S. Cl.
CPC ................ *B62M 1/36* (2013.01); *B62M 9/00* (2013.01)

(58) Field of Classification Search
CPC ........... B62M 1/36; B62M 9/00; B62M 9/105
See application file for complete search history.

(56) References Cited

U.S. PATENT DOCUMENTS 3,477,303 A * 11/1969 Brilando .................. B62M 9/10
474/144
2010/0167881 A1    7/2010 Day
(Continued)

FOREIGN PATENT DOCUMENTS

| CN | 110621573 A | 12/2019 |
| DE | 102015000715 A1 | 8/2015 |
| EP | 0002964 A1 | 7/1979 |

OTHER PUBLICATIONS

German Office Action corresponding to DE 10 2020 102 460.6 issued Oct. 6, 2020 and English Translation (12 pages).
(Continued)

*Primary Examiner* — Daniel D Yabut
(74) *Attorney, Agent, or Firm* — LUCAS & MERCANTI, LLP (57) ABSTRACT

A pedal crank drive having a pedal crank (12) and a chain ring (14), which can be connected to each other in a rotationally fixed manner to form a unit (10), the unit (10) having a spindle hole (16) for a bottom bracket spindle. The chain ring (14) has a first connecting contour (18) and the pedal crank (12) has a second connecting contour (20), wherein the connecting contours (18, 20) can be fitted into one another in an assembly position, and the pedal crank (12) and the chain ring (14) can be rotated relative to one another around the spindle hole (16) to a stop position in which the stop surfaces (22, 24) of the pedal crank (12) and the chain ring (14) abut against each other.

20 Claims, 11 Drawing Sheets

(56) References Cited

U.S. PATENT DOCUMENTS

| | | | |
|---|---|---|---|
| 2015/0082939 A1* | 3/2015 | Meyer | B62M 3/00 |
| | | | 74/594.2 |
| 2017/0174288 A1* | 6/2017 | Wu | B62M 9/105 |
| 2018/0037296 A1* | 2/2018 | Hamamoto | F16F 15/1245 |
| 2019/0162287 A1* | 5/2019 | Hamamoto | B62M 6/55 |
| 2019/0195331 A1* | 6/2019 | Hanke | B62M 9/02 |
| 2020/0001945 A1* | 1/2020 | Hamamoto | F16F 15/12 |
| 2020/0156736 A1 | 5/2020 | Tavares Miranda | |

OTHER PUBLICATIONS

International Search Report corresponding International Application No. PCT/EP2021/052219 dated Apr. 6, 2021 and English Translation (6 pages).

Tawianese Office Action and Search Report Corresponding to Taiwanese Application No. 110103690, mailed on Jul. 2, 2024, with English Translation (20 pages).

\* cited by examiner

PEDAL CRANK DRIVE COMPRISING A PEDAL CRANK AND A CHAIN RING, AND PRODUCTION METHOD

CROSS REFERENCE TO RELATED APPLICATION

This application is a 371 of PCT/EP2021/052219 filed on Jan. 29, 2021, which in turn claims the benefit of German Application No. 10 2020 102 460.6 filed on Jan. 31, 2020, the contents of which is incorporated herein by reference.

BACKGROUND OF THE INVENTION

The invention relates to a pedal crank drive comprising a pedal crank and a chain ring and a method of manufacturing such a pedal crank drive.

Pedal crank drives of the type in question are used in particular for two-wheeled vehicles. These can be bicycles operated purely by human muscle power, as well as bicycles with an additional drive, especially bicycles with an additional electric drive, for example so-called e-bikes and/or pedelecs. However, such a pedal crank drive can also be used in other technical equipment, such as ergometers, pedal boats, go-karts or similar.

In the case of pedal crank drives of the type in question, the chain ring and the pedal crank can be connected to each other in a rotationally fixed manner to form a unit. This unit has a spindle hole for a bottom bracket spindle.

According to the state of the art, the cranks have corresponding star-shaped crank spiders to allow connection to the chain ring. The star-shaped crank spiders usually have finger-like projections which extend—in a star shape—away from the centre of the spindle hole for the bottom bracket spindle and have connecting areas at their ends. They can be connected to the chain rings via these connecting areas using suitable connecting elements. The connecting elements are usually bolts, which are designed in a way that is optimized for the purpose of connecting the chain ring to the pedal crank.

Such a connection between chain ring and pedal crank requires a number of such bolts and is therefore comparatively laborious to produce. However, it is possible to replace worn chain rings by releasing the bolt connection between chain ring and pedal crank and connecting a new chain ring to the pedal crank.

Alternatively, a firm connection between a chain ring and a pedal crank can be created by permanently attaching the chain ring to the pedal crank by causing plastic deformation of the material. Such connections between chain rings and pedal cranks can be machine-made in a comparatively inexpensive manner, especially with short cycle times. A disadvantage of such connections is, however, that they are not released again. If the chain ring is worn, the entire unit consisting of pedal crank and chain ring must be replaced. This not only leads to increased costs when replacing a chain ring, but also to increased damage to the environment, as otherwise fully functional pedal cranks must be disposed of along with the chain rings.

SUMMARY OF THE INVENTION

The invention is therefore based on the task of providing a pedal crank drive of the type described above, which allows for cost-effective manufacture of the connection between pedal crank and chain ring and at the same time allows the replacement of worn chain rings.

DETAILED DESCRIPTION OF THE INVENTION

The task is solved by a device and a method having the features of the independent claims. The features of the dependent claims concern advantageous embodiments.

The task is solved by the fact that the chain ring has a first connecting contour and the pedal crank has a second connecting contour, wherein the connecting contours can be fitted into one another in an assembly position and the pedal crank and chain ring can be rotated relative to one another around the spindle hole into a stop position in which stop surfaces of the pedal crank and the chain ring abut against one another. The stop surfaces of the pedal crank and the chain ring, which abut against one another, serve in particular to transmit the rotational movement of the pedal crank to the chain ring when using the pedal crank drive. In other words, forces acting in the circumferential direction are introduced into the chain ring by the pedal crank via the abutting stop surfaces. The circumferential direction here refers to the axis of rotation of the pedal crank drive, i.e. the axis of rotation of a bottom bracket spindle which is accommodated in the spindle hole for the bottom bracket spindle. In other words, a torque is transmitted from the pedal crank to the chain ring via the circumferentially oriented stop surfaces.

In particular, the second connecting contour is formed integrally with the pedal crank. This means in particular that the second connecting contour and the pedal crank have been manufactured from the same workpiece. This allows for a cost-effective production.

In particular, the pedal crank and/or the second connecting contour can be made of aluminium and/or an aluminium alloy and the chain ring of steel. This material combination is particularly advantageous as a compromise between cost, weight and wear resistance. Due to the connection according to the invention, the pedal crank and the chain ring, when being scrapped, can easily be separated from one another and the different metals can be re-used mono-materially.

The fitting of the connecting contours into each other in the assembly position is achieved in particular by pushing the first connecting contour and the second connecting contour into each other in a direction parallel to the axis of rotation of the pedal crank drive. The subsequent relative rotational movement between the pedal crank and the chain ring occurs particularly around this axis of rotation. In particular, the connecting contours create a positive fit that prevents the chain ring from being removed from the pedal crank in a direction parallel to the axis of rotation. In other words, the pedal crank and the chain ring, in particular the first and second connecting contours, are joined together in the manner of a bayonet mount. The positive fit is created in particular by one or more undercuts, which are formed between the first connecting contour and the second connecting contour by the rotational movement from the assembly position to the stop position. In the stop position, further rotation between the pedal crank and the chain ring in the direction of rotation from the assembly position towards the stop position is initially no longer possible. In this position, the chain ring can also be secured by suitable measures by twisting it in the opposite direction. This can prevent the chain ring from being unintentionally released from the pedal crank through an opposite rotational movement, i.e. a rotational movement from the stop position to the assembly position. The type of safety device suitable for this purpose depends in particular on the further design of the pedal crank drive. Typically, such a pedal crank drive must transmit the torque from the pedal crank to the chain ring in only one direction. This direction corresponds to the relative rotational movement that the pedal crank and the chain ring perform relative to each other to reach the stop position. In some applications, however, forces are also transmitted in the opposite direction, for example when using so-called back-pedaling brakes. Especially in such cases, the operational safety of the pedal crank unit can be ensured by locking the pedal crank and the chain ring in the stop position.

The first connecting contour may have at least one inwardly projecting protrusion on a central recess of the chain ring. The inward protrusion can be a protrusion on a circular central recess of the chain ring. It is understood in this context that the central recess must deviate from the circular shape due to the protrusions. A circular central recess is therefore to be understood as a recess which has a circular shape where there are no projections.

Such a connecting contour can be produced comparatively easily on the chain ring. The protrusions are suitable for engaging behind corresponding areas of the second connecting contour when the chain ring is connected to the pedal crank, thus creating a connection between the chain ring and the pedal crank in the manner of a bayonet mount.

The pedal crank may have a receiving portion, the second connecting contour having at least one groove which extends along a circumferential surface of the receiving portion in the circumferential direction and has an insertion opening leading to the front face of the receiving portion. In particular, the receiving portion may be designed cylindrical, preferably circular-cylindrical. Such design makes it easier to slide on and later twist the chain ring when connecting the chain ring to the pedal crank. Corresponding advantages also arise when releasing the chain ring from the pedal crank.

In this context, the circumferential direction or surface refers to the axis of rotation of the pedal crank drive. Due to its extension in the circumferential direction, the groove can, for example, accommodate and guide an inwardly projecting protrusion of the first connecting contour during the rotational movement when connecting the pedal crank and chain ring. The insertion opening leading to the front face of the receiving portion makes it possible, when connecting the chain ring to the pedal crank, to push an inwardly projecting protrusion of the chain ring through the insertion opening into the groove when the chain ring is pushed into contact with the pedal crank along the axis of rotation of the pedal crank drive. When the chain ring is then rotated relative to the pedal crank, the protrusion slides in the groove until it reaches the stop position. In the stop position, it is in particular no longer possible to remove the inwardly projecting protrusion from the groove by a relative movement between the chain ring and the pedal crank directed along the bottom bracket axis.

In particular, a stop surface of the pedal crank can extend outwards from the groove bottom. Such an arrangement of the stop surface allows a complementary stop surface of a protrusion of the first connecting contour projecting into the groove to abut against the stop surface of the pedal crank. The stop surfaces suitable for torque transmission can thus be designed advantageously.

In particular, the stop surfaces of the pedal crank and the chain ring may have a curvature, the curvature extending particularly in the plane of the chain ring. A stop surface with such a curvature can be produced in a simple manner with a side milling cutter, the axis of rotation of the side milling cutter being oriented in particular parallel to the axis of rotation of the pedal crank drive, while the stop surface is produced with the side milling cutter.

In particular, the groove extending along the circumferential surface of the receiving portion of the pedal crank in the circumferential direction shall be made with a side milling cutter, in particular the same side milling cutter. The axis of rotation of the side milling cutter is especially oriented parallel to the axis of rotation of the pedal crank drive.

It is advantageous if a side milling cutter, especially the same side milling cutter, is also used to create the insertion opening that connects the groove with the front face of the receiving portion. The axis of rotation of the side milling cutter is especially oriented parallel to the axis of rotation of the pedal crank drive.

The at least one protrusion of the first connecting contour may be designed in such a way that it tapers in the circumferential direction towards its stop surface. In particular, this can concern the area of the protrusion of the first connecting contour immediately adjacent to the stop surface only. Such a taper, which may be a bevelled surface on the protrusion, for example, makes it easier for the protrusion to engage behind the second connecting contour during the rotational movement of the chain ring from the assembly position to the stop position. In particular, the sliding of the protrusion in a groove of the second connecting contour is simplified, especially after the protrusion has previously been inserted into the groove through the insertion opening.

The pedal crank and the chain ring can be locked in particular by the fact that the pedal crank unit has a locking element for locking the pedal crank and the chain ring in the stop position. Such a locking element makes it possible to effectively prevent unintentional rotation of the chain ring from the stop position to the assembly position. At the same time, the locking can be designed in such a way that releasing and/or removing the locking element releases the locking and allows the chain ring and the pedal crank to be separated in a simple manner.

For example, the locking element can be a bolt. To lock the chain ring, the bolt can project through an opening, especially a bore, in the chain ring and be screwed into the pedal crank. Such a design allows for easy locking and unlocking of the lock, wherein common tools in particular can be used. For example, a standard Allen screw can be used. In this way, no exotic special tools are required to release the lock.

BRIEF DESCRIPTION OF THE SEVERAL VIEWS OF THE DRAWING

Further preferred embodiments and advantages of the invention are described below in connection with the drawings. These show the following.

The unit 10 of a pedal crank drive as shown in the figures is formed by connecting the pedal crank 12 with the chain ring 14 to form the unit 10. The unit 10 has a spindle hole 16 for a bottom bracket spindle.

Figure 1:
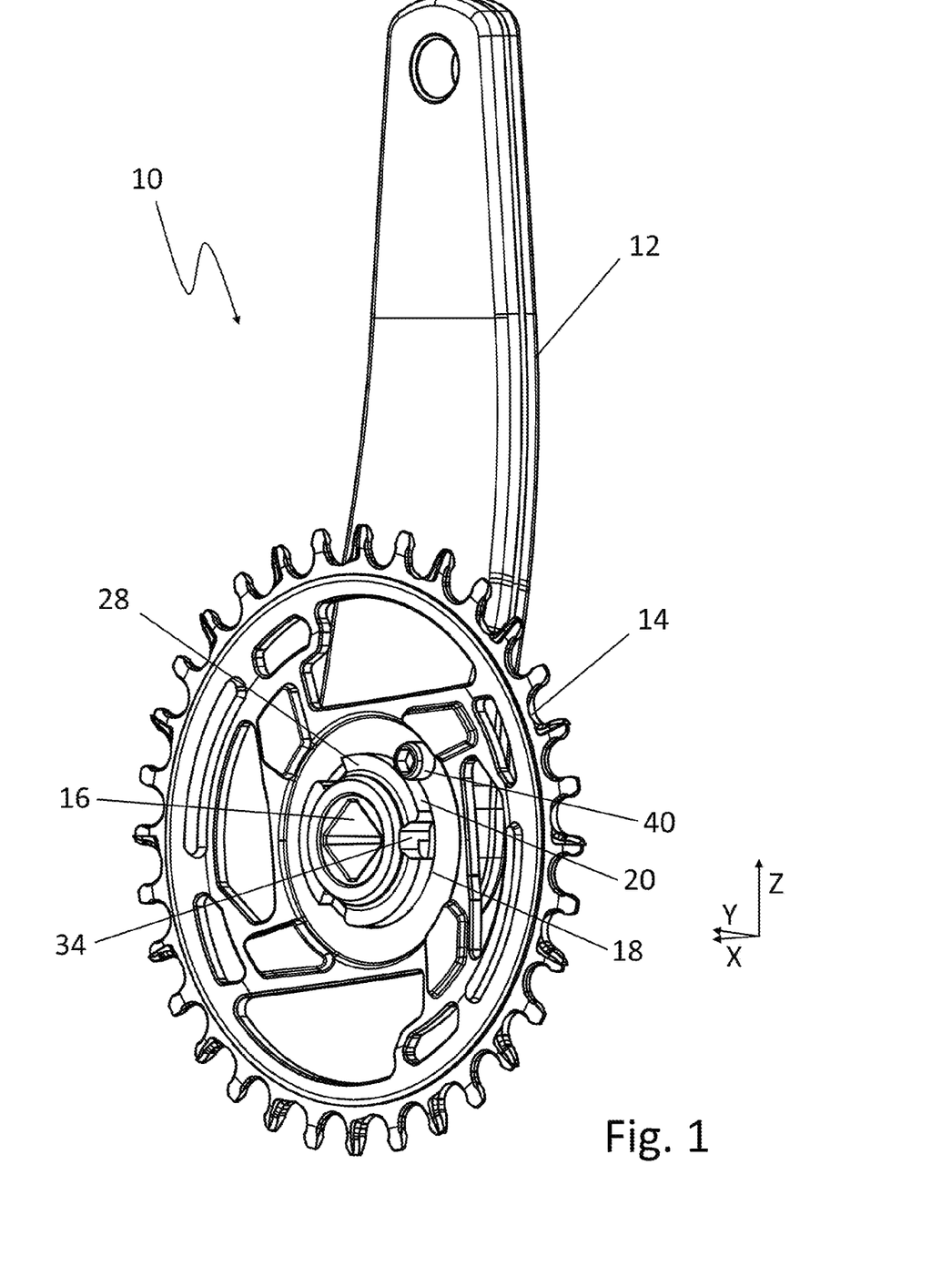
FIG. 1 an exemplary unit of pedal crank and chain ring,
FIG. 2 the chain ring of the unit in FIG. 1,
FIG. 3 an enlarged view of the first connecting contour of the chain ring as shown in FIG. 2,
FIG. 4 an enlarged view of a protrusion of the connecting contour as shown in FIG. 3,
FIG. 5 the pedal crank of the unit as shown in FIG. 1,
FIG. 6 detailed view of an insertion opening that makes possible to start mounting of the chain ring.
Figure 2:
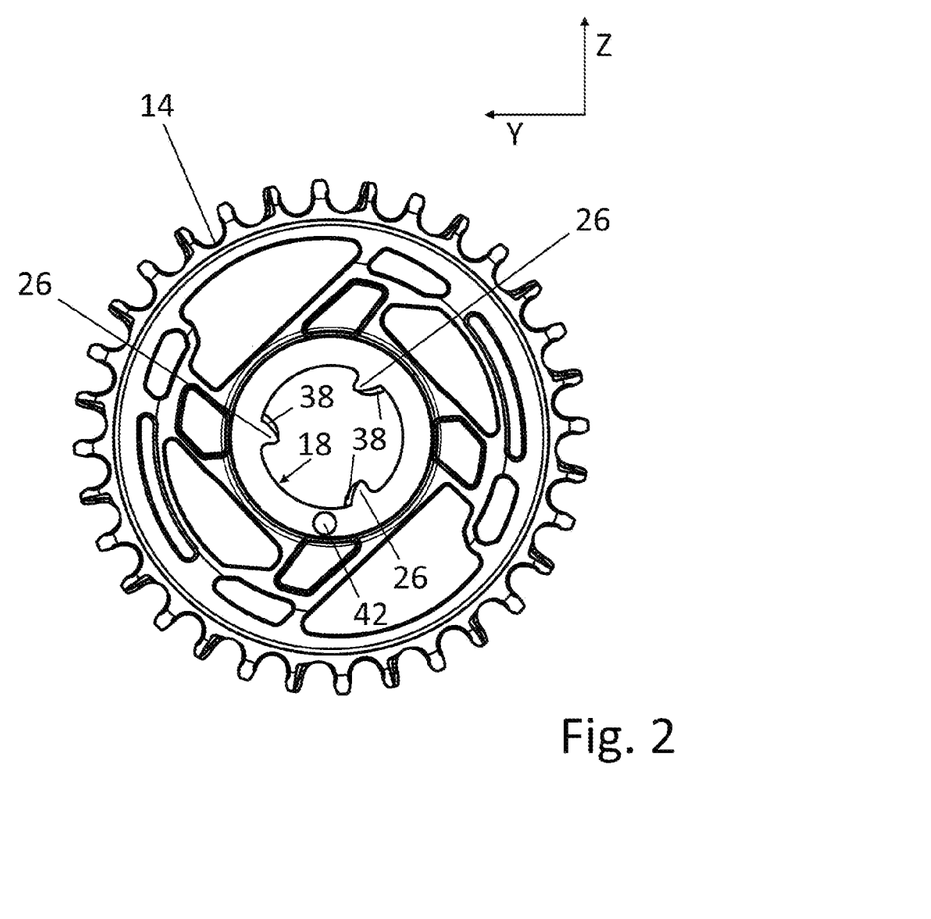
Figure 3:
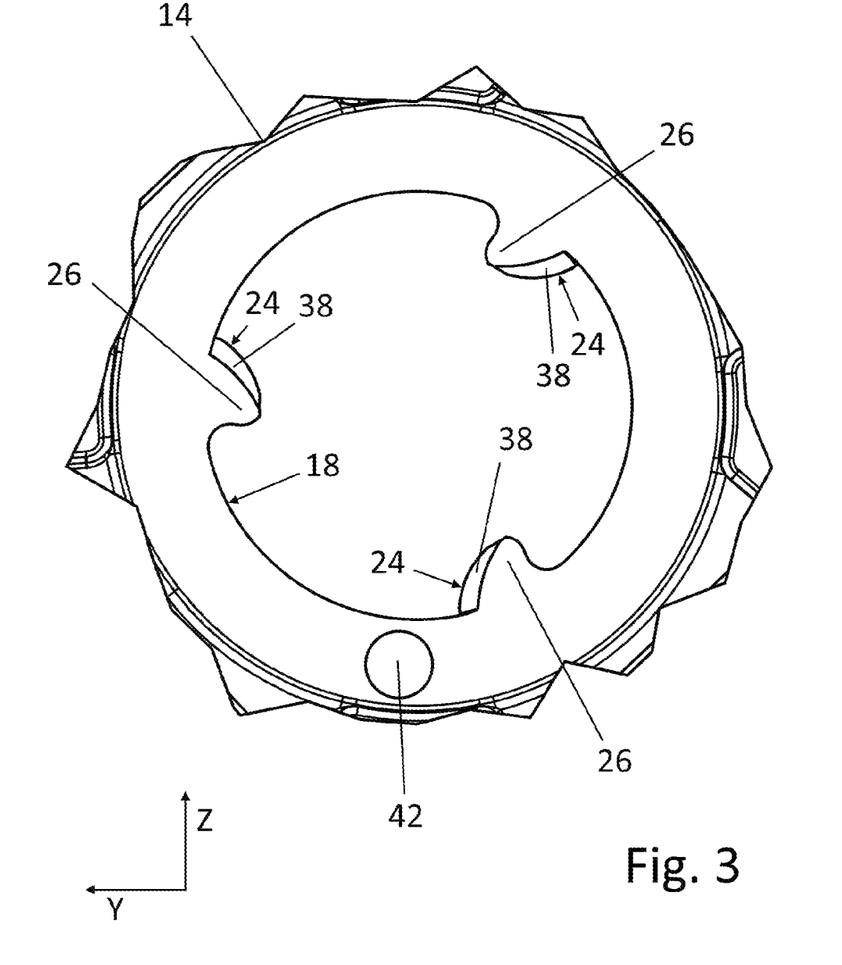
Figure 4:
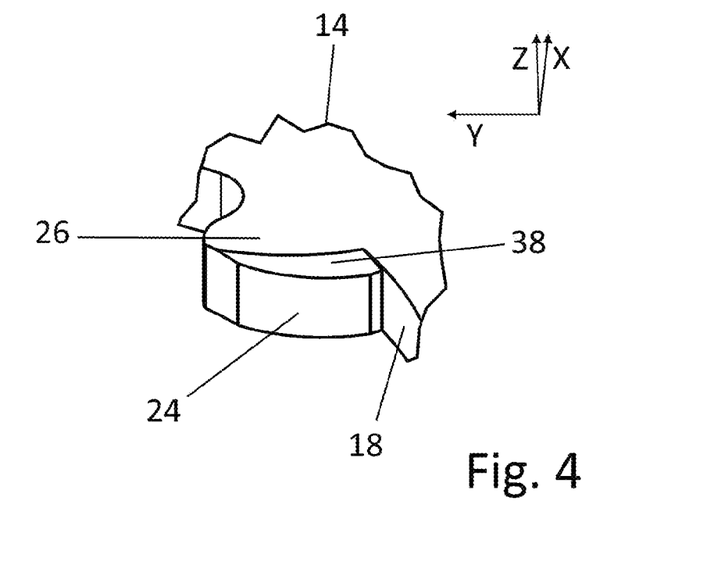
Figure 5:
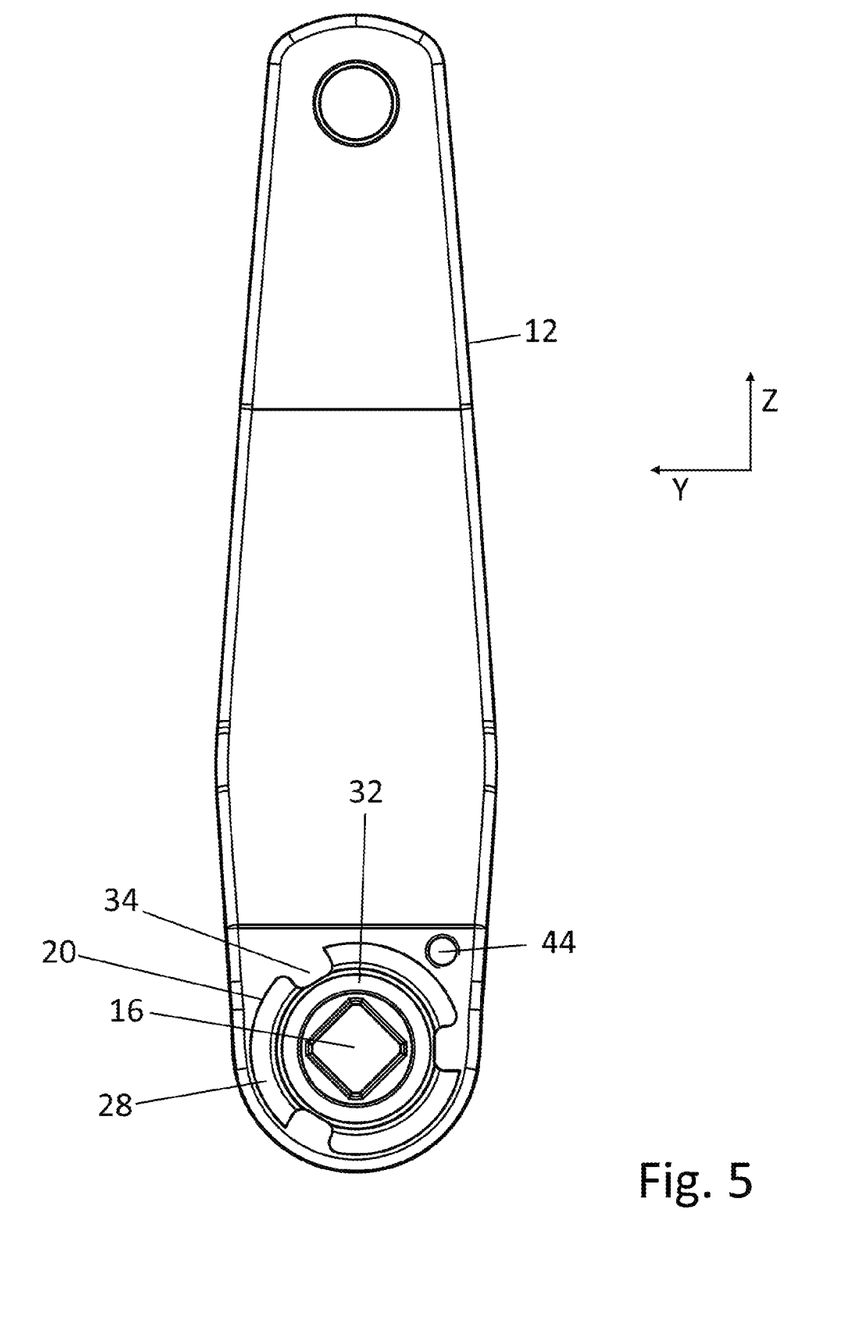
Figure 6:
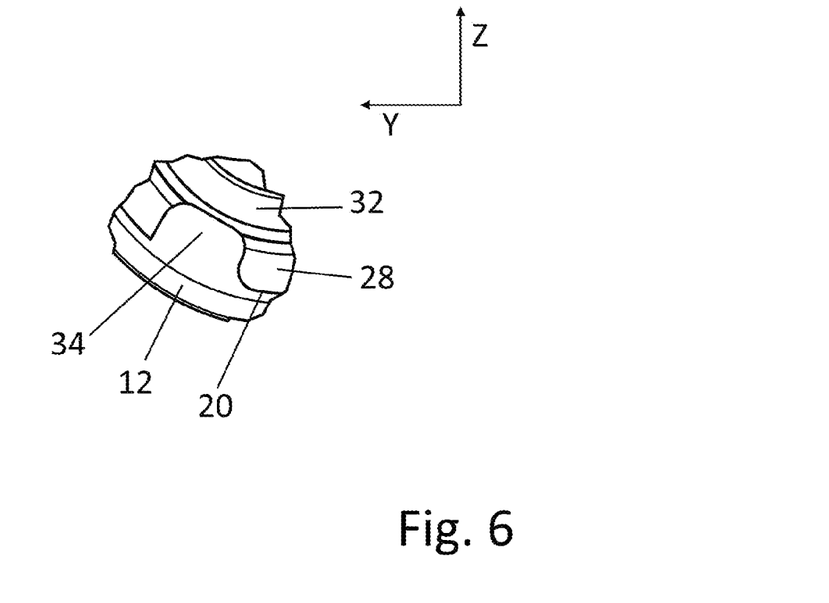
Figure 7:
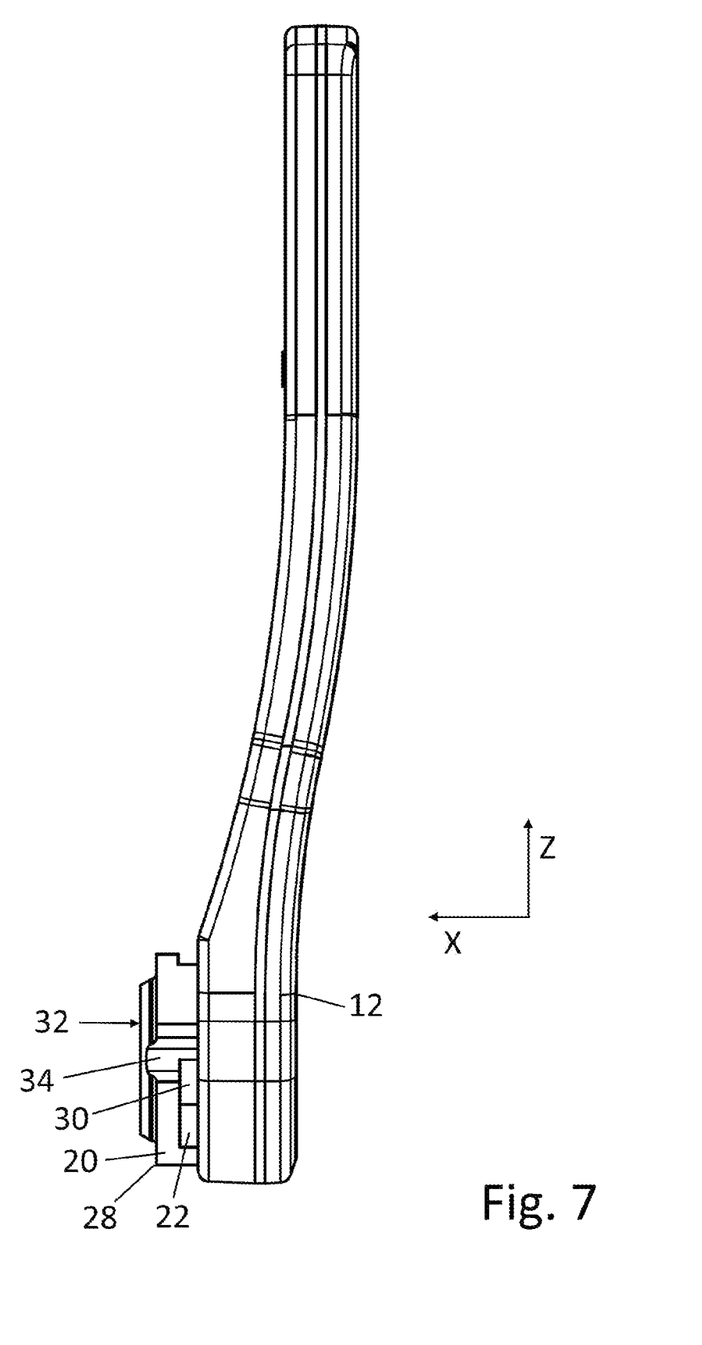
FIG. 7 the pedal crank as shown in FIG. 5 from a different perspective, FIG. 8 sectional view of a part of the crank as shown in FIGS. 5 and 6, FIG. 9 the unit as shown in FIG. 1 with chain ring and pedal crank in the assembly position, FIG. 10 the unit as shown in FIG. 1 with chain ring and pedal crank during movement from the assembly position to the stop position, FIG. 11 the unit from FIG. 1 with chain ring and pedal crank in the stop position.
Figure 8:
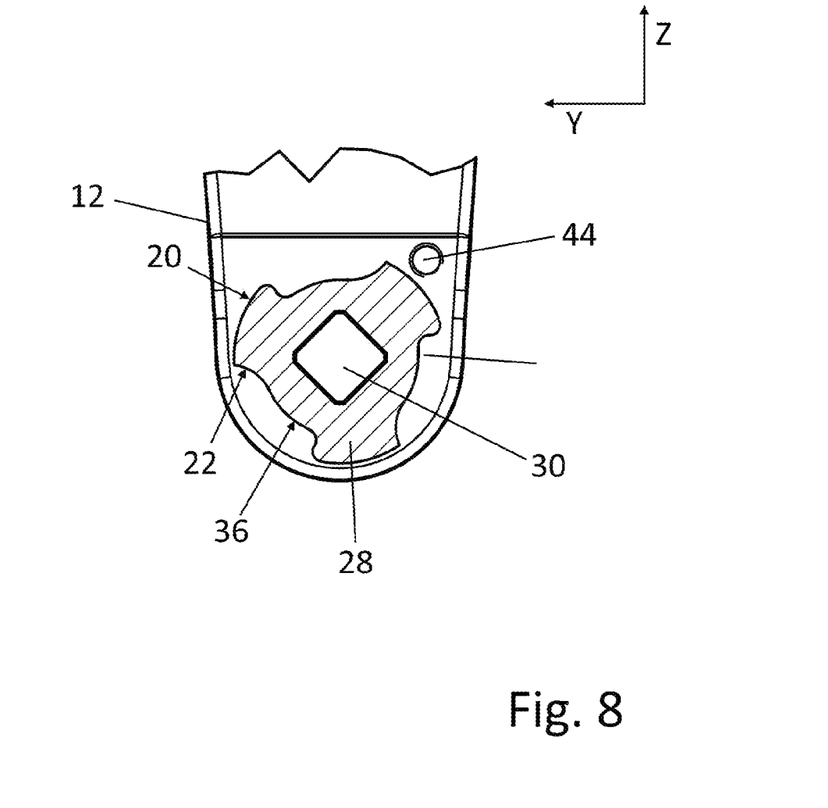

The chain ring 14 has a first connecting contour 18. The pedal crank 12 has a second connecting contour 20. The first connecting contour 18 and the second connecting contour 20 can be fitted into one another. The connecting contours 18, 20 are fitted into one another by rotating the pedal crank 12 and chain ring 14 relative to each other around the spindle hole 16 into a stop position. In the stop position, stop surfaces 22 of the pedal crank 12 and stop surfaces 24 of the chain ring 14 abut against each other. The stop surfaces 22 of the exemplary pedal crank 12 can be seen in particular in FIG. 7. A stop surface 24 of the chain ring 14 is shown in particular in FIG. 3 and FIG. 4.

As shown in the figures, the second connecting contour 20 may be formed integrally with the pedal crank 12.

The first connecting contour 18 of the chain ring 14 may have at least one inwardly projecting protrusion 26. In the example shown in the figures, the first connecting contour 18 has three protrusions 26. As in the example, the protrusions 26 can be distributed at regular intervals along the circumference of the first connecting contour 18.

Correspondingly, as shown in the example represented in the figures, the pedal crank 12 can have a receiving portion 28, which can be designed to be cylindrical, as in the example shown. The second connecting contour 20 may now have at least one groove 30 extending circumferentially along the circumferential direction of the receiving portion 28. Preferably, the number of the grooves 30 corresponds to the number of the protrusions 26. Preferably, the pedal crank 12 has exactly one groove 30 for each protrusion 26. In particular, the pedal crank 12 can have three grooves 30 as in the example shown. The grooves 30 can be arranged at regular intervals along the circumference of the receiving portion 28 as shown.

The at least one groove 30 can have an insertion opening 34 leading to the front face 32 of the receiving portion 28. In particular, each of the grooves 30 can have an insertion opening 34. Accordingly, as shown in the example, three insertion openings 34 can be provided. In particular, the insertion openings 34 may be distributed at regular intervals along the circumference of the receiving portion 28 as shown.

In particular, the pedal crank 12 can be designed as shown such that a stop surface 22 of the pedal crank 12 extends outwards from the bottom 36 of the groove 30. This may apply in particular to all stop surfaces 22 of the pedal crank 12 as shown. The stop surfaces 22 of the pedal crank 12 and/or stop surfaces 24 of the chain ring 14 may have a curvature as shown, the curvature extending in particular in the plane of the chain ring 14 as shown. Such a curvature can result in particular from the production of the groove 30 by means of a side milling cutter.

At least one of the protrusions 26 can be designed in such a way that it tapers towards the stop surface 24. In particular, all protrusions 26 may be designed such that they taper towards their respective stop surfaces 24. This can be made possible, as in the example shown, by the fact that the protrusion 26 has a bevelled surface 38, which, in particular, may be at an acute angle to the plane in which the chain ring 14 extends. In particular, the bevelled surface can be adjacent to the stop surface 24 of the chain ring 14, as shown by way of example in FIG. 4.

In particular, the pedal crank drive may have a locking element 40 for locking the pedal crank 12 and the chain ring 14 in the stop position. The locking element 40 can be a bolt, as shown in the example. The locking element 40 can project through an opening 42 in the chain ring 14 and be fixed to the pedal crank 12. The fixing of the locking element 40 to the pedal crank 12 can, for example, be effected as shown by screwing the locking element 40 into an internal thread 44 of the pedal crank 12.

Figure 9:
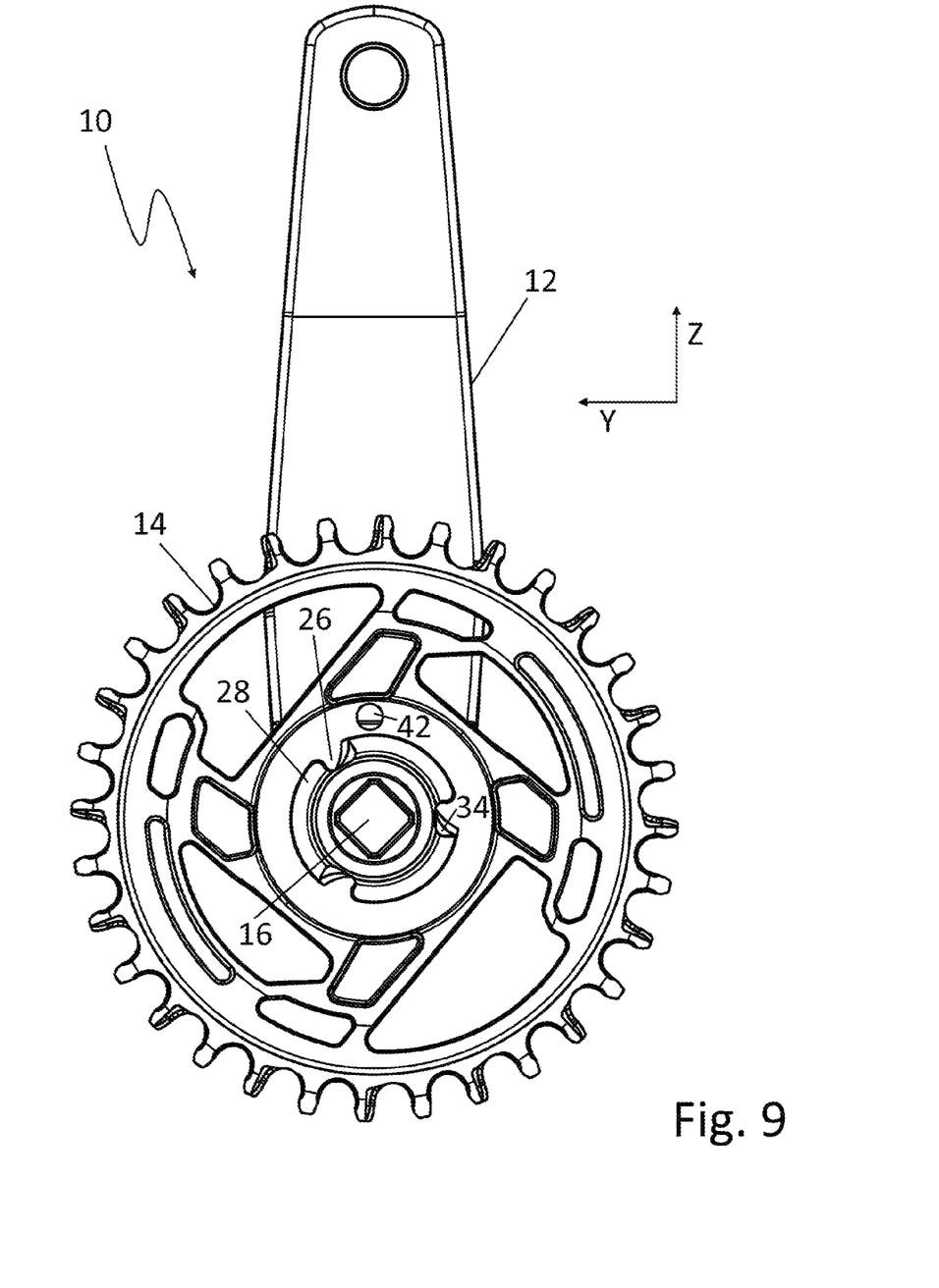
Figure 10:
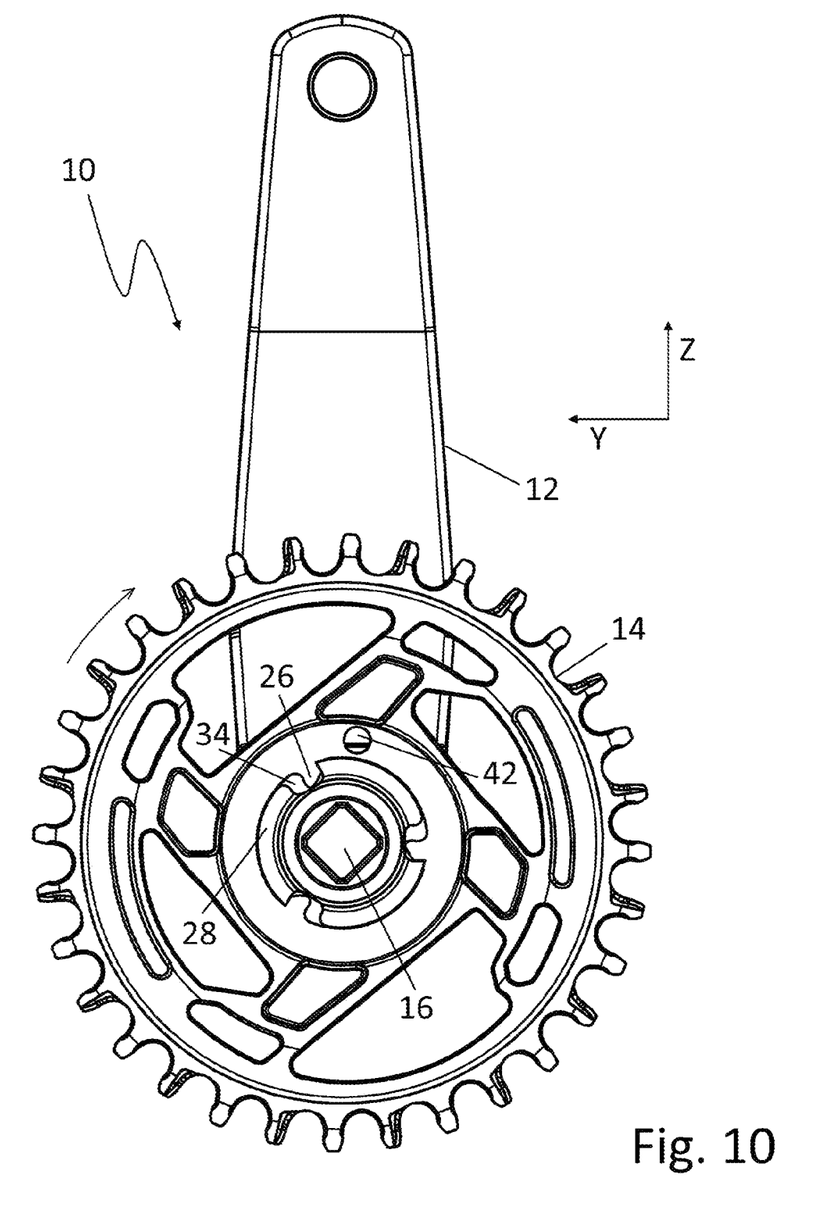
Figure 11:
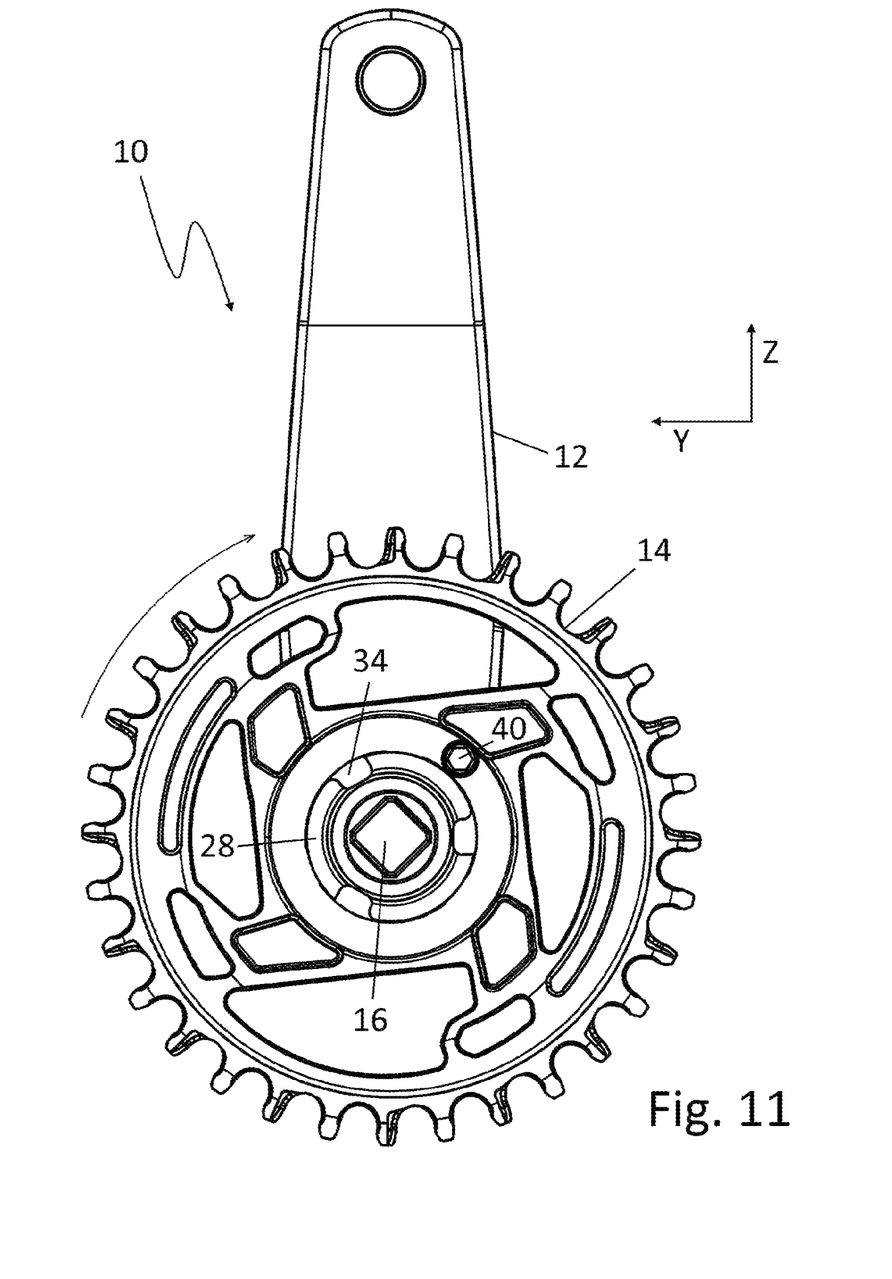

FIGS. 9 to 11 show step by step the connection of the chain ring 14 and the pedal crank 12 to form a unit 10. First, the chain ring 14 is pushed onto the receiving portion 28 of the pedal crank 12 in the assembly position. This is shown in FIG. 9. The protrusions 26 of the first connecting contour 18 of the chain ring 14 pass through the insertion openings 34 of the second connecting contour 20 of the pedal crank 12.

Then the chain ring 14 is rotated around the spindle hole 16 to the stop position. This process is illustrated in FIG. 10. The protrusions 26 slide into the grooves 30, and due to an undercut between the protrusions 26 of the chain ring 14 and the receiving portion 28 of the pedal crank 12, a positive fit is formed which prevents the chain ring 14 from being pulled off the receiving portion 28. The rotational movement ends when the stop surfaces 22 of the pedal crank 12 and the stop surfaces 24 of the chain ring 14 abut against each other. This state is shown in FIG. 11. In the example shown, the opening 42 is aligned in this position with the internal thread 44. Thus, by screwing in the locking element 40, the chain ring 14 can be locked relative to the pedal crank 12 in the position shown in FIG. 11. In this way, the chain ring 14 and the pedal crank 12 are connected in a rotationally fixed manner.

The features of the invention disclosed in the present description, in the drawings as well as in the claims may be essential for the realisation of the invention in its various embodiments, either individually or in any combination. The invention is not limited to the described embodiments. It can be varied within the scope of the claims and taking into account the knowledge of the relevant person skilled in the art.

LIST OF REFERENCE SIGNS 10 unit
12 pedal Crank
14 chain ring
16 spindle hole
18 first connecting contour
20 second connecting contour
22 stop surfaces of the pedal crank
24 stop surfaces of the chain ring
26 protrusion
28 receiving portion
30 groove
32 front face
34 insertion opening
36 groove bottom
38 bevelled surface
40 locking element 42 opening
44 internal thread

The invention claimed is:

1. A pedal crank drive comprising a pedal crank (12) and a chain ring (14) connected to one another in a rotationally fixed manner to form a unit (10), the unit (10) having a spindle hole (16) for a bottom bracket spindle, wherein the chain ring (14) has a first connecting contour (18) and the pedal crank (12) has a second connecting contour (20), wherein the first and second connecting contours (18, 20) are fitted into one another in an assembly position, and the pedal crank (12) and the chain ring (14) are rotated relative to one another around the spindle hole (16) into a stop position in which stop surfaces (22, 24) of the pedal crank (12) and the chain ring (14) abut against each other, and wherein the first connecting contour (18) has at least one inwardly projecting protrusion (26) on a central recess of the chain ring (14) having a circular shape.

2. The pedal crank drive according to claim 1, wherein stop surfaces (22, 24) of the pedal crank (12) and the chain ring (14) have a curvature, the curvature extending in a plane of the chain ring (14).

3. The pedal crank drive according to claim 1, wherein the at least one inwardly projecting protrusion (26) of the first connecting contour (18) tapers in the circumferential direction towards its stop surface.

4. The pedal crank drive according to claim 1, wherein the second connecting contour (20) is integral with the pedal crank (12).

5. The pedal crank drive according to claim 1, wherein the pedal crank (12) and/or the second connecting contour (20) is/are made of aluminium and/or an aluminium alloy and the chain ring (14) is made of steel.

6. A pedal crank drive comprising a pedal crank (12) and a chain ring (14) connected to one another in a rotationally fixed manner to form a unit (10), the unit (10) having a spindle hole (16) for a bottom bracket spindle, wherein the chain ring (14) has a first connecting contour (18) and the pedal crank (12) has a second connecting contour (20), wherein the first and second connecting contours (18, 20) are fitted into one another in an assembly position, and the pedal crank (12) and the chain ring (14) are rotated relative to one another around the spindle hole (16) into a stop position in which stop surfaces (22, 24) of the pedal crank (12) and the chain ring (14) abut against each other, and wherein the pedal crank (12) has a receiving portion (28) having a cylindrical shape, the second connecting contour (20) having at least one groove (30) extending along a circumferential surface of the receiving portion (28) in a circumferential direction, wherein the at least one groove (30) has an insertion opening (34) leading to a front face (32) of the receiving portion (28).

7. The pedal crank drive according to claim 6, wherein at least one stop surface (22, 24) of the pedal crank (12) extends outwards from a groove bottom (36).

8. The pedal crank drive according to claim 6, wherein stop surfaces (22, 24) of the pedal crank (12) and the chain ring (14) have a curvature, the curvature extending in a plane of the chain ring (14).

9. The pedal crank drive according to claim 6, wherein the second connecting contour (20) is integral with the pedal crank (12).

10. The pedal crank drive according to claim 6, wherein the pedal crank (12) and/or the second connecting contour (20) is/are made of aluminium and/or an aluminium alloy and the chain ring (14) is made of steel.

11. A pedal crank drive comprising a pedal crank (12) and a chain ring (14) connected to one another in a rotationally fixed manner to form a unit (10), the unit (10) having a spindle hole (16) for a bottom bracket spindle, wherein the chain ring (14) has a first connecting contour (18) and the pedal crank (12) has a second connecting contour (20), wherein the first and second connecting contours (18, 20) are fitted into one another in an assembly position, and the pedal crank (12) and the chain ring (14) are rotated relative to one another around the spindle hole (16) into a stop position in which stop surfaces (22, 24) of the pedal crank (12) and the chain ring (14) abut against each other, and wherein the pedal crank drive has a locking element (40) for locking the pedal crank (12) and the chain ring (14) in the stop position.

12. The pedal crank drive according to claim 11, wherein the locking element (40) is a bolt which projects through an opening (42), in the chain ring (14) and is screwed into an internal thread (44) of the pedal crank (12).

13. The pedal crank drive according to claim 11, wherein stop surfaces (22, 24) of the pedal crank (12) and the chain ring (14) have a curvature, the curvature extending in a plane of the chain ring (14).

14. The pedal crank drive according to claim 11, wherein the second connecting contour (20) is integral with the pedal crank (12).

15. The pedal crank drive according to claim 11, wherein the pedal crank (12) and/or the second connecting contour (20) is/are made of aluminium and/or an aluminium alloy and the chain ring (14) is made of steel.

16. A method of manufacturing a pedal crank drive comprising a pedal crank (12) and a chain ring (14) connected to one another in a rotationally fixed manner to form a unit (10), the unit (10) having a spindle hole (16) for a bottom bracket spindle, wherein the chain ring (14) has a first connecting contour (18) and the pedal crank (12) has a second connecting contour (20), wherein the first and second connecting contours (18, 20) are fitted into one another in an assembly position, and the pedal crank (12) and the chain ring (14) are rotated relative to one another around the spindle hole (16) into a stop position in which stop surfaces (22, 24) of the pedal crank (12) and the chain ring (14) abut against each other, the method comprising by means of a side milling cutter, cutting a groove (30) extending along the circumferential surface of the receiving portion (28) of the pedal crank (12) in the circumferential direction.

17. The method according to claim 16, wherein the insertion opening connecting the groove (30) with the front face (32) of the receiving portion (28) is also produced with a side milling cutter.

18. The pedal crank drive according to claim 16, wherein stop surfaces (22, 24) of the pedal crank (12) and the chain ring (14) have a curvature, the curvature extending in a plane of the chain ring (14).

19. The pedal crank drive according to claim 16, wherein the second connecting contour (20) is integral with the pedal crank (12).

20. The pedal crank drive according to claim 16, wherein the pedal crank (12) and/or the second connecting contour (20) is/are made of aluminium and/or an aluminium alloy and the chain ring (14) is made of steel.

* * * * *